(12) United States Patent
Coleman et al.

(10) Patent No.: US 7,118,774 B2
(45) Date of Patent: Oct. 10, 2006

(54) CEREAL BARS AND METHODS OF THEIR MANUFACTURE

(75) Inventors: Edward C. Coleman, New Fairfield, CT (US); Sharon R. Birney, Yorktown Heights, NY (US); Rita W. Brander, New Rochelle, NY (US)

(73) Assignee: Kraft Foods Holdings, Inc., Northfield, IL (US)

( * ) Notice: Subject to any disclaimer, the term of this patent is extended or adjusted under 35 U.S.C. 154(b) by 841 days.

(21) Appl. No.: 10/334,032

(22) Filed: Dec. 30, 2002

(65) Prior Publication Data

US 2004/0126477 A1    Jul. 1, 2004

(51) Int. Cl.
*A23L 1/168* (2006.01)

(52) U.S. Cl. .................. 426/619; 426/96; 426/103; 426/580; 426/583; 426/588

(58) Field of Classification Search ............... 426/96, 426/103, 580, 583, 588, 619
See application file for complete search history.

(56) References Cited

U.S. PATENT DOCUMENTS

| | | | |
|---|---|---|---|
| 3,431,112 A * | 3/1969 | Durst .................... | 426/89 |
| 3,582,336 A | 6/1971 | Rasmusson | |
| 3,821,443 A * | 6/1974 | Halladay et al. ........ | 426/93 |
| 3,903,308 A | 9/1975 | Ode | |
| 3,917,861 A | 11/1975 | Viera et al. | |
| 4,055,669 A * | 10/1977 | Kelly et al. ............ | 426/93 |
| 4,451,488 A | 5/1984 | Cook et al. | |
| 4,543,262 A | 9/1985 | Michnowski | |
| 4,689,238 A | 8/1987 | Hitchner | |
| 6,303,163 B1 | 10/2001 | Wu | |
| 6,558,718 B1 * | 5/2003 | Evenson et al. ........ | 426/72 |
| 6,592,915 B1 * | 7/2003 | Froseth et al. ......... | 426/93 |

FOREIGN PATENT DOCUMENTS

WO    WO 01/22835 A1    4/2001

* cited by examiner

*Primary Examiner*—Helen Pratt
(74) *Attorney, Agent, or Firm*—Fitch, Even, Tabin & Flannery

(57) ABSTRACT

A cereal bar and its method of production is provided, in which the cereal bar comprises a pressed mixture including (I) a cereal mixture including ready-to-eat (RTE) cereal pieces and a first binder, (ii) a filler comprising a plurality of discrete agglomerates in which the agglomerates individually comprise a plurality of particles comprising milk protein product joined together with a second binder, and the first binder binds the cereal pieces and the agglomerates together. The cereal bars of the present invention provide nutritional value without sacrificing taste and flavor, as well as possess a reasonable shelf life during which the texture remains chewy without being sticky, hard, or crumbly.

20 Claims, No Drawings

CEREAL BARS AND METHODS OF THEIR MANUFACTURE

FIELD OF THE INVENTION

This invention relates to production of a cereal bar. More particularly, it relates to production of a cereal bar comprising a pressed mixture including (I) a cereal mixture including ready-to-eat cereal pieces and a first binder, (ii) a filler comprising a plurality of discrete agglomerates in which the agglomerates individually comprise a plurality of particles comprising milk protein product joined together with a second binder; wherein the first binder binds the cereal pieces and the agglomerates together. The cereal bars of the present invention provide nutritional value without sacrificing taste and flavor, as well as possess a reasonable shelf life during which the texture remains chewy without being sticky, hard, or crumbly. Among the more specific benefits and advantages accruing from the invention, moisture migration and protein hydration is essentially confined to the small discrete agglomerates dispersed throughout the bar containing the particles of milk protein product and their binder. This aspect of the invention provides and preserves a more desirable texture in the bar over time.

BACKGROUND OF THE INVENTION

Hand-held cereal bars are well known in the art. These portable foods are consumed as a meal substitute or snack. These cereal bars ideally would provide nutritional value without sacrificing taste and flavor, as well as possess a reasonable shelf life during which the texture remains chewy without being sticky, hard, or crumbly. However, achieving all of these goals has been problematic in the prior cereal bars.

For instance, a protein source is usually included in the cereal bars for nutritional value. However, the use of large amounts of soy proteins in cereal bars tends to impart an undesirable off-flavor. Milk protein products generally are more organoleptically acceptable if not beneficial flavor imparting. On the other hand, many useful milk protein products are water-soluble. Water absorption by or dissolution into water by the milk proteins over an extended period before consumption can lead to moisture migration, protein hydration problems, and hardness over time. The prior art has not satisfactorily proposed how to incorporate milk protein products into cereal bars.

Cereal bars have been known which can contain a dairy protein product in a binder system used as a matrix to form the bar. For instance, U.S. Pat. No. 3,431,112 to Durst describes a food bar using a binder providing a structural matrix for discrete edible particles described as cereal particles, in which the binder is obtained as a water-based dispersion including a film-forming ingredient described as nonfat milk solids (e.g., sodium caseinate, among others) that is solubilized in the aqueous binder dispersion that is used in that form or in a spray dried form thereof, in which the binder is then mixed with cereal flakes from which food bars are formed.

U.S. Pat. No. 4,055,669 to Kelly et al. describes high protein fat-occluded food compositions used as a binder to bind together cereal particles in a food or breakfast bar product. The binder composition includes protein, fat, and carbohydrate ingredients in which the protein ingredient preferably is either a dairy protein product (e.g., nonfat milk solids or sodium caseinate) or a vegetable protein product. The binder composition is prepared by initially preparing a dry blend of the carbohydrate and protein, which is mixed with molten fat at elevated temperature with mixing, and the resulting binder composition is then blended with cereal particles at a blending temperature above the crystallization temperature df the fat in the range of 100–140° F., and the resulting cereal-binder mixture is formed into bar shapes. In a preferred embodiment, the resulting crude mixture of molten fat and the dry blend of the carbohydrate and protein is milled to reduce the protein and carbohydrate particle sizes; the milled binder composition is then reheated and subjected to further mixing to enhance the fluidity of the mixture, before it is combined with the cereal pieces at the blending temperature above the crystallization temperature of the fat.

U.S. Pat. No. 4,689,238 to Hitchner describes a composite food product comprising a dual-texture, low water activity binder having at least one-food flavoring material distributed therein, and comprising two binder materials. A crisp binder material comprising a whipped protein foam and a protein foam stabilizer and a chewy binder material comprising a gelled solution of gelatin in glycerol were used. The crisp binder material is a whipped aqueous solution containing sodium caseinate, soy protein isolate, gelatin, or other proteins that can be foamed from an aqueous solution.

U.S. Pat. No. 3,903,308 to Ode describes a food bar made by distributing a sweetened low-moisture whole milk product as a binder over a cereal layer of toasted granola cereal. The milk product is described as sweetened condensed milk. U.S. Pat. No. 3,582,336 to Rasmussen describes cereal particles encapsulated with an oil-milk-sugar mixture in which sufficient cladding constituent can be applied to render the product in fixed bar-like form.

Cereal and milk bars also are known that have included milk powder as a protein source in a cereal layer or a filling layer. For instance, U.S. Pat. No. 3,917,861 to Viera et al. describes a laminated, multi-phase food bar including a cereal-binder mixture forming a cereal layer on at least one side of a filling layer. The cereal-binder mixture has cereal particles bonded together by a fat-based binder system consisting essentially of a triglyceride-sugar matrix and colloidal silicon dioxide particles used as a fat gelling agent. The cereal layer is laminated on one or both sides of a filling layer that contains triglyceride-hydrogenated vegetable oil, colloidal silicon dioxide, and sugar. A protein source, such as soy protein isolate or extract and egg whites may be included in the cereal and/or filling layers for nutritional balance. The '861 patent describes a bar including 5 and 20 parts by weight dry milk solids, sodium caseinate and/or soy bean extract.

WO 0122835 A1 to Froseth et al. describes a cereal bar that includes two outer cereal layers, and an inner milk filling layer including milk powder as an ingredient. Protein nuggets are dispersed with RTE cereal pieces in the cereal layers. The nuggets are described as high protein rice pieces and texturized vegetable protein made from soybeans.

U.S. Pat. No. 4,543,262 to Michnowski describes a high protein, low or no lactose snack bar having a core composed of a corn syrup, a confectioner's coating material which is normally solid at room temperature, a wetting agent, a vitamin and mineral premix, at least one high carbohydrate content source, and at least one high protein content source such as caseinate, soy protein, and others. A chocolate surface coating and a granular granola topping are then applied.

Cereal bars are also known that are made without milk products. For instance, U.S. Pat. No. 3,821,443 to Halladay et al. describes a cereal bar containing at least one filling layer composed of an oil normally liquid at body temperature, sugar, and a synergistic combination of protein source, such as soy protein and egg white solids.

U.S. Pat. No. 4,451,488 to Cook et al. describes a food bar combining at least two different polyhydric alcohols in varying ratios comprising a sugar alcohol and either glycerol or propylene glycol with dry ingredients, shortening, and sugar.

U.S. Pat. No. 6,303,163 to Wu describes a process for preparing a hand-held snack item in which a first edible, heat-sensitive food material to an initial formed hand-held food item selected from a granola bar, cereal bar, grain cake, or breakfast bar, to form a preliminarily coated food item, to which a second edible food coating material is applied which protects the first edible, heat sensitive material during a subsequent heat treatment conducted at from about 35–350° C.

None of the above-listed references describes cereal and milk bars that include a system for confining moisture migration and protein hydration to discrete sites distributed throughout the bar.

The present inventive method and product thereof significantly reduces, and in some cases essentially eliminates, the problems and shortcomings of the prior practice by including particulates within a cereal bar that effectively confine moisture migration and protein hydration so that the bar retains a more desirable texture over time, among other benefits.

SUMMARY OF THE INVENTION

This invention relates to production of a cereal bar that comprises a pressed mixture including (I) a cereal mixture including ready-to-eat (RTE) cereal pieces and a first binder and (ii) a filler comprising a plurality of discrete agglomerates wherein the agglomerates individually comprise a plurality of particles comprising milk protein product joined together with a second binder, wherein the first binder binds the cereal pieces and the agglomerates together.

The cereal bars of the present invention provide nutritional value without sacrificing taste and flavor, as well as possess a reasonable shelf life during which the texture remains chewy without being sticky, hard, or crumbly. As such, the cereal bars of the present invention are portable, shelf life-stable foods that can be used as a meal substitute, supplement, or snack food. Among the more specific benefits and advantages accruing from the invention, moisture migration and protein hydration is essentially confined to the small discrete agglomerates dispersed throughout the bar containing the particles of milk protein product and their binder. This provides and preserves a more desirable texture in the bar over time.

In one preferred embodiment of this invention, a cold-pressed cereal bar is produced having baked or unbaked particulate inlays made of agglomerates containing particles of water-soluble, lactose-containing milk protein product bound together by a binder. One exemplary agglomerate composition contains NFDM, milk protein concentrate (MPC), and/or milk protein isolate as the milk protein product, and glycerine as the agglomerate binder. The agglomerates optionally can be baked to a preferred water activity ($A_w$) value of less than about 0.5. The agglomerates also can optionally include other milk product ingredients such as fat-free or essentially fat-free cream cheese products to intensify the flavor of the agglomerates.

DETAILED DESCRIPTION OF THE INVENTION

The present invention relates to a cereal bar and methods of its production, in which the cereal bar includes a cereal mixture containing ready-to-eat ("RTE") cereal pieces and a filler bound together with a binder system, in which the filler comprises a plurality of discrete agglomerates wherein the agglomerates individually comprise a plurality of particles comprising milk protein product joined together with a binder. The cereal bar of the present invention is a "finger food" that is flavorful and chewy, and it may be eaten by hand without leaving substantial residues on the hands or other surfaces to which it comes into contact. Moisture migration and protein hydration is essentially confined to the small discrete agglomerates dispersed throughout the bar containing the particles of milk protein product and their binder. This provides and preserves a more desirable texture in the cereal bar.

The filler part of the cereal bar mixture has agglomerates that are prepared in advance of the admixture of the filler part with the cereal mixture ingredients. The ingredients of the agglomerates include a milk protein product powder and binder that are mixed and formed into a particulate in which each discrete agglomerate comprises a cluster of milk protein product particles adhered together with a binder to form a self-supporting composite particle. As such, the agglomerates each contain a plurality of solid (non-solubilized) milk protein particles bound together with a suitable binder that will hold the particles together as a small composite cluster. The agglomerates generally have an average size of from 1 to 10 mm, and more specifically from 3 to 5 mm.

For purposes herein, a "binder" refers to a material that essentially acts as an "edible glue" for combining and holding together relatively dry ingredients as a self-supporting body.

Preferably, the agglomerate binder is also a water absorptive binding material. In the present invention, the binder used in forming the agglomerates preferably includes a polyhydric alcohol, such as, for example, glycerine, sorbitol, and/or mannitol, individually or in combinations thereof. The binder, such as glycerine, is generally used to make the high protein content bar stay soft and pliable, and thus chewy, by trapping water in the bar at the agglomerates.

Shortening, such as vegetable shortening, also can be included in the agglomerate formulation as a binder. Carbohydrates, gelatin, and egg solid products also can be included in the binder.

The agglomerate binder is used in sufficient amounts that the agglomerates will retain their self-supporting integrity during production of the cereal bar and its shelf life, and provide the water activity property desired, as described in more detail below. The amount of binder needed or useful for providing these properties can vary depending on the combinations of milk protein products and binding materials being used for a particular application. In general, the agglomerates individually may comprise about 10 to about 70 percent of a plurality of particles comprising milk protein product selected from the group consisting of non fat dry milk, milk protein concentrate, milk protein isolate, individually or any combination thereof, bound together with about 5 to about 60 percent of a binder.

Once formed, the agglomerates can be baked to obtain a desired water activity $A_w$ of about 0.5 or less. Higher water activities can result in the agglomerates, and hence the bar as a whole, becoming too soft and less chewy in texture and mouthfeel. Higher water activities are also undesirable due to migration problems occurring between discrete food components having higher water content to food components of lower water content within the product, leading to loss in texture and/or flavor. The present invention significantly inhibits, and in some cases effectively eliminates, this water migration problem.

Alternatively, unbaked agglomerates can be formulated to include supplemental ingredients such as humectants or additional small molecular weight materials to attain the desired water activity of about 0.5 or less.

The milk protein products are selected based on the balance of nutritional value, e.g., protein content and/or calcium advantage, and flavor or other organoleptic attributes desired to be introduced by this ingredient. Examples of useful milk protein products that can be obtained in particle or powder form that are suitable for use in agglomerate production according to this invention include, for example, non fat dry milk, milk protein concentrate, milk protein isolates, casein, caseinates, milk protein hydrolysates, whey protein concentrates, whey protein isolates, individually or any combination thereof.

For purposes herein, "non fat dry milk" or "NFDM" refers to a powder product obtained by removing water from pasteurized skim milk by drying (e.g., spray drying). NFDM often has a protein content of about 35 percent on a dry basis. The NFDM can be instant (i.e., agglomerated) or non-instant (i.e., regular).

"Milk protein concentrate" or "MPC" refers a powder product containing about 42 to about 85 percent protein content on a dry basis produced from pasteurized skim milk by processes such as ultrafiltration, evaporation, and/or drying.

"Milk protein isolate" or "MPI" refers a powder product containing greater than about 85 percent protein content on a dry basis produced from pasteurized skim milk by processes such as ultrafiltration, evaporation, and/or drying.

"Casein" is commercially made from pasteurized skim milk by precipitation by acid, or by coagulation by rennet, followed by water washing and drying. Rennet casein usually contains about 89 percent protein content, while acid casein usually contains about 95 percent protein content. Neutralization of casein provides caseinate salts. "Caseinate salts" usually contain about 94 percent protein content. "Whey protein concentrates" or "WPC" are obtained from whey by processes such as ultrafiltration, evaporation, and/ or drying. WPC usually contains about 34 to about 80 percent protein content. Also, "co-precipitates" of casein and whey proteins also have been conventionally made by adding calcium chloride or dilute acid to skim milk and heating the mixture to precipitate those substances. Co-precipitates usually contain about 89 to about 94 percent protein content. "Milk protein hydrolysates" are produced by enzymatic hydrolysis of casein, WPC, or MPI.

Therefore, for purposes herein, "milk protein product" refers to one or more sources of milk proteins obtained from skim milk. Such sources of milk proteins include, for example, NFDM, MPC, MPI, casein, caseinates, hydrolysates, whey protein concentrates, and whey protein isolates, used individually or in combinations thereof.

The fat content of these above-named milk protein content sources is relatively low. The fat content is generally less than about 2 percent for these products, other than WPC 34 or higher, which is about 3 to about 5 percent. Thus, these milk protein products have high nutritional value without adding high fat content. The lactose content of NFDM is about 52 percent; about 46 to about 4 percent for MPC 42 to MPC 80, respectively; and about 51 to about 4 percent for WPC 34 to WPC 80, respectively. Thus, these milk protein products in particular retain significant lactose content that can impart beneficial natural flavoring to a cereal bar.

As generally known, since NFDM, MPC, MPI, and WPC production does not alter the proteins, they are soluble in water. By contrast, the processes used to make acid and rennet casein result in casein products which are insoluble in water. Caseinates, which are typically provided as salts of potassium or calcium are rendered water soluble by the neutralization treatment. Co-precipitates are water insoluble unless treated with neutralizers similar to that used for producing caseinates. However, since whey proteins are denatured during production of co-precipitates, the whey protein portion of the co-precipitates may remain incompletely soluble even after treatment with neutralizers.

This invention is particularly well-suited for incorporating water soluble milk protein products having some lactose retained but relatively low fat content, such as NFDM and/or MPC, into a cereal bar in way in which the proteins are not prematurely hydrated during production. Such cereal bars generally have shelf lives of at least about 12 months under ambient storage conditions. In accordance with this invention, the introduction of the milk protein products in the form of agglomerates containing a water scavenging binder like glycerine achieves this goal.

The agglomerates also can be formulated with additional functional additives and flavorings such as a dairy filler product such as fat-free or essentially fat-free cream cheese products, emulsifiers, salt, sugar, and the like. In one preferred embodiment, a fat-free or essentially fat-free cream cheese product can be used as the major component of the agglomerate formulation while the milk protein product(s) and binder are minor components thereof, yet used in sufficient amounts to provide their respective functions as described above.

The agglomerates are premixed with ready-to-eat ("RTE") cereal pieces to provide a uniform dry mixture. The resulting dry mixture is mixed with a binder system for the aggregate cereal bar mixture in sufficient amounts and manner to extensively distribute binder over the agglomerates and RTE cereal pieces. The resulting bar composition is cold pressed (i.e., pressed at or near room temperature) and cut into bar shapes. The resulting bars can be packaged in a conventional or otherwise suitable manner for such products.

The ready-to-eat ("RTE") cereal can contain any known or suitable RTE cereal, such as, for example, any type of Post Selects™, Cheerios®, Chex®), Wheaties®, Total®, Rice Crispies™, Cap'n Crunch™, K-Sentials™, and so forth, individually or in a combination thereof. The RTE cereal used in the present invention is not, however, limited to commercially available cereals. The RTE cereal is added as whole or crushed pieces, or a combination thereof. Crushed cereal pieces generally have a particle size of greater than about 30 mesh and less than about 6 mesh.

The binder system used for the cereal mixture preferably includes a polyhydric alcohol, such as those previously described as being suitable for the agglomerate binder, alone or in combination with a carbohydrate-based binder such as, for example, one or more of corn syrup, corn syrup solids, molasses, honey, and the like. In this way, the binder system includes binding materials that also lend sweetening flavor to the cereal mixture. Other binding materials also can be included such as gelatin, hydrolyzed collagen, egg solids, and so forth.

The cereal mixture, which is considered herein as comprising the RTE cereal pieces and binder system, generally comprises about 25 to about 75 percent RTE cereal pieces, and about 15 to about 60 percent binder system. In one preferred embodiment, the binder system introduced via the cereal mixture includes glycerine and corn syrup products, such as, for example, about 5 to about 15 percent glycerine, and about 20 to about 60 percent corn syrup-containing products.

The cereal mixture and filler agglomerates are generally combined in about a 2:1 to about 4:1 ratio, respectively, and more particularly in about a 3:1 ratio, respectively.

Vegetable oils and/or vegetable shortenings also can be included in the cereal mixture as binders and/or film formers. Soy lecithin can be included to adjust the fluidity of the cereal mixture/filler mixture to a desirable level. A sweetener can be added to the cereal mixture and/or the agglomerate formulation. The sweetener preferably is a carbohydrate-based sweetening material including mono-, di-, and polysaccharides and their derivatives. Suitable sweeteners include, for example, corn syrup, corn syrup solids, corn sweetener, sucrose, fructose, honey, molasses, malt syrups, starches, lactose, dextrose, maltose, maltodextrins, individually or in any combinations thereof.

Other food-flavoring additives can be included in the cereal mixture and/or filler such as, for example, salt, spices, herbs, vanilla, cocoa, chocolate, cinnamon, cheese solids, fruit particles, nuts, seeds, candies, coconut, and so forth. Non-flavoring additives also can be included in the cereal mixture, such as vitamins, minerals, antioxidants, excipients like calcium carbonate, and so forth. Such additives can be included to the extent they do not introduce objectionable flavors or adversely impact the texture or water activity properties or processability of the cereal bar. Generally, such additives are added at levels of less than about 5 percent.

In a preferred embodiment, no water or milk is separately added as an ingredient to the agglomerate or cereal mixture formulations.

The mixture of the cereal mixture and filler is pressed, preferably cold-pressed (i.e., at ambient temperatures without heating the mixture or platens) sufficient to compact the mixture into a consolidated mixture of substantially uniform thickness. The compression can be applied by spreading the mixture onto a leveled surface and applying compression from above. Any convenient suitable means can be used in this respect, such as by a mold, pressure platen or platens, a compression roller or rollers, or a conveyor belt. The compression treatment will increase the density of the mixture. For example, the compression may increase the density of the mixture by about 25 to 150 percent. In one exemplary non-limiting embodiment, the compression increases the density of the mixture from about 0.2 to about 0.4 g/cc before compression to about 0.45 to about 0.65 cc after compression.

The cereal bar can be formed in any suitable shape, size and thickness. It can have a regular or irregular geometric shape. Regular geometric shapes include, for example, rectangular, square, circular, or oval cross-sections. The bar also optionally can be formed including a continuous milk filling layer, a topping layer, or a coating, such as, for example, the types illustrated in WO 01/22835, which descriptions are incorporated herein by reference. Although not limited thereto, the cereal bars may be cut into sizes having a weight of about 20 g to about 100 g.

The cereal bars can be packaged in any suitable manner. In one embodiment, the bars are individually wrapped such as in conventional flexible metallized film known in the art and used for this general purpose. The individually wrapped bars can be packaged in a secondary container, or a plurality of wrapped bars can be packaged in a common secondary container or carton.

The following examples are intended to illustrate the invention and not to limit it. Unless otherwise indicated, all percentages, ratios, or parts used in the present specification are by weight. All patents and other publications cited in the present specification are hereby incorporated by reference.

EXAMPLE 1

This example illustrates the production of a cereal bar containing baked, milk protein product-containing chips according to an embodiment of this invention.

A milk filler composition was prepared by mixing the ingredients indicated in Table 1 into a uniform mixture.

TABLE 1

Milk Filler

| Ingredient | Percent |
| --- | --- |
| Cheesekake Blend ®[1] | 58.7 |
| Powdered Sugar (6x) | 9.4 |
| Shortening[2] | 4.7 |
| Glycerine | 4.7 |
| Milk Protein Isolate[3] | 7.0 |
| Milk Protein Concentrate[4] | 12.9 |
| Non Fat Dry Milk (NFDM) | 2.3 |
| Emulsifier[5] | 0.15 |
| Salt | 0.15 |

[1]A cream cheese analog that is a cream cheese derivative in which dairy fat has been removed from cream cheese, made by Kraft Foods.
[2]Tem-Tex ® 1225, partially hydrogenated soybean and cottonseed oils with mono-and diglycerides, SFI @ 70° F.: 19.5 ± 2.0, SFI @ 104° F.: 8.0 ± 1.5, alpha mono, %: 3.2 ± 0.2, Humkol Oil Products, Cordova, TN.
[3]Alapro ™ 4900, NZMP.
[4]Arla PSDL25, Arla Foods.
[5]Sodium stearoyl lactylate.

The milk filler composition was baked at 350° F. (177° C.) until the internal temperature reaches or exceeds 185° F. (85° C.). The milk filler product obtained was cut into discrete chips having an average size of about 3 to about 5 mm.

The cereal mixture contained the ingredients and respective proportions indicated in Table 2.

TABLE 2

Cereal Mixture

| Ingredient | Percent |
| --- | --- |
| Post Selects ™ Cereal[6] | 53.3 |
| Corn Syrup 63 DE | 17.4 |
| Corn Syrup Solids 42 DE | 5.6 |
| Corn Syrup Solids 20 DE | 11.2 |
| Glycerine | 7.0 |
| Partially Hydrogenated Vegetable Oil[7] | 3.5 |
| Calcium Carbonate | 1.4 |
| Soy Lecithin | 0.5 |
| Salt | 0.12 |

[6]"Cranberry Almond."
[7]Apex B, partially hydrogenated soybean and cottonseed oils, SFI: 70° F., 2.5 max., Humkol Oil Products, Cordova, TN.

The baked milk filler chips were initially combined with dry ingredients of the cereal mixture with stirring to form a uniform mixture. Then, the remaining ingredients of the cereal mixture, which included the binder system and other additives, were added with mixing. One part baked milk filler chips were added per three parts cereal mixture. The resulting cereal bar mixture was cold pressed under 300 g platen pressure, and then was cut into bars.

The cereal bar produced in this manner was subjected to organoleptic evaluations and was found to have a savory flavor and texture.

While this example has been illustrated with a particular formulation, it will be appreciated that the milk filler formulation optionally can contain other ingredients such as, for example, soy, egg white, gelatin, and so forth.

EXAMPLE 2

This example illustrates the production of a cereal bar containing unbaked, milk protein product-containing chips according to another embodiment of this invention.

A milk filler composition was prepared by mixing the ingredients indicated in Table 3 into a uniform mixture.

TABLE 3

Milk Filler

| Ingredient | Percent |
|---|---|
| NFDM | 62.5 |
| Glycerine | 37.5 |

The glycerine was slowly poured into the NFDM while mixing. The mixture was mixed on low speed until crumbles of the mixture were formed (generally about 1 minute or less). The milk filler composition of Table 3 was not baked.

A cereal mixture of the same formulation as described in Table 2 above was combined with the milk filler crumbles made according to this example.

The milk filler chips were initially combined with dry ingredients of the cereal mixture with stirring to form a uniform mixture. Then, the remaining ingredients of the cereal mixture, which included the binder system and other additives, were added with mixing. One part unbaked milk filler chips were introduced per three parts cereal mixture. The resulting cereal bar mixture was cold pressed under 300 g platen pressure, and then was cut into bars.

The cereal bar produced in this manner was subjected to organoleptic evaluations and also was found to have a savory flavor and texture.

While this example has been illustrated with a particular formulation, it will be appreciated that the milk filler formulation optionally can contain other ingredients such as, for example, fat, sugar, and so forth.

While the invention has been described in terms of preferred embodiments, those skilled in the art will recognize that the invention can be practiced with modification within the spirit and scope of the appended claims.

We claim:

1. A cereal bar, comprising a self-supporting mixture of (I) a cereal mixture including ready-to-eat cereal pieces and a first binder, (ii) a filler comprising a plurality of discrete agglomerates wherein the agglomerates individually comprise a plurality of particles comprising milk protein product joined together with a second binder, wherein the first binder binds the cereal pieces and the agglomerates together.

2. The cereal bar as defined in claim 1, wherein the milk protein product is selected from the group consisting of non fat dry milk, milk protein concentrate, milk protein isolate, and mixtures thereof.

3. The cereal bar as defined in claim 1, wherein the milk protein product is selected from the group consisting of non fat dry milk, milk protein concentrate, milk protein isolate, casein, caseinate, milk protein hydrolysate, whey protein concentrate, whey protein isolate, and mixtures thereof.

4. The cereal bar as defined in claim 1, wherein the first binder comprises a polyhydric alcohol.

5. The cereal bar as defined in claim 1, wherein the second binder comprises a polyhydric alcohol.

6. The cereal bar as defined in claim 1, further comprising a sweetener.

7. The cereal bar as defined in claim 1, wherein the first binder comprises a binder system containing glycerine and a corn syrup-containing product.

8. The cereal bar as defined in claim 1, wherein the cereal mixture and filler agglomerates are combined in a ratio of about 2:1 to about 4:1, respectively.

9. The cereal bar as defined in claim 1, where the filler further comprises a fat-free or an essentially fat-free cream cheese product.

10. A cereal bar comprising a mixture of:
   (I) a cereal mixture comprising about 25 to about 75 percent RTE cereal pieces, about 5 to about 15 percent glycerine, and about 20 to about 60 percent combined corn syrup products; and
   (ii) a filler comprising a plurality of discrete agglomerates bound together with a second binder, wherein the agglomerates individually comprise about 20 to about 70 percent plurality of particles comprising milk protein product selected from the group consisting of non fat dry milk, milk protein concentrate, milk protein isolate, and mixtures thereof, bound together with about 5 to about 60 percent of a second binder selected from the group consisting of vegetable shortening and glycerine, and mixtures thereof.

11. The cereal bar as defined in claim 10, wherein the cereal mixture and filler agglomerates are combined in a ratio of about 2:1 to about 4:1, respectively.

12. The cereal bar as defined in claim 10, where the filler further comprises a fat-free or an essentially fat-free cream cheese product.

13. A method of making cereal bars, comprising the steps of:
   (I) forming a filler comprising mixing particles comprising milk protein product and a binder effective to form discrete agglomerates individually comprising a plurality of the particles bound together with a portion of the binder;
   (ii) combining the agglomerates with RTE cereal pieces to provide a premix;
   (iii) mixing the premix with a binder system to form a mix;
   (iv) pressing the mix; and
   (v) cutting the cereal bars from the pressed mix.

14. The method according to claim 13, wherein the agglomerates are baked before being combined with the RTE cereal pieces.

15. The method according to claim 13, wherein the combining step comprises admixing the cereal mixture and filler agglomerates in a ratio of about 2:1 to about 4:1, respectively.

16. The method according to claim 13, wherein the forming step comprises adding a binder comprising glycerine and particles comprising a milk protein product selected from the group consisting of non fat dry milk, milk protein concentrate, and milk protein isolate, and mixtures thereof.

17. The method according to claim 13, wherein the forming step comprises adding particles comprising a milk protein product selected from the group consisting of non fat dry milk, milk protein concentrate, milk protein isolates, casein, caseinates, milk protein hydrolysates, whey protein concentrates, whey protein isolates, and mixtures thereof.

18. The method according to claim 13, wherein the mixing step comprises adding glycerine as at least part of the cereal bar binder.

19. The method according to claim 13, wherein the forming of the filler further comprises adding a fat-free or an essentially fat-free cream cheese product.

20. Cereal bars prepared by a method comprising the steps of:
- (I) forming a filler comprising mixing particles comprising milk protein product and a binder effective to form discrete agglomerates individually comprising a plurality of the particles bound together with a portion of the binder;
- (ii) combining the agglomerates with RTE cereal pieces to provide a premix;
- (iii) mixing the premix with a binder system to form a mix;
- (iv) pressing the mix; and
- (v) cutting the cereal bars from the pressed mix.

* * * * *